United States Patent [19]
Carter

[11] 3,814,346

[45] June 4, 1974

[54] RETRACTABLE SAFETY BELT DEVICE

[76] Inventor: Martin L. Carter, 568 D. Lynn Court, Glendale Heights, Glen Ellyn, Ill. 60137

[22] Filed: Oct. 20, 1965

[21] Appl. No.: 498,765

[52] U.S. Cl. ............................ 242/107.2, 242/107 SB
[51] Int. Cl. ............................................ A62b 35/00
[58] Field of Search ........ 242/107 SB, 107.2, 107.4; 297/385, 388

[56] References Cited
UNITED STATES PATENTS

| | | | |
|---|---|---|---|
| 559,022 | 4/1896 | Barnes | 242/107.2 |
| 3,174,704 | 3/1965 | Replogie | 242/107.4 |
| 3,286,946 | 11/1966 | Board et al. | 242/107.2 |
| 3,287,062 | 11/1966 | Board et al. | 242/107.2 |
| 3,341,150 | 9/1967 | Board et al. | 242/107.2 |
| 3,692,253 | 9/1972 | Curran | 242/107.4 |

*Primary Examiner*—Werner H. Schroeder

[57] ABSTRACT

A safety belt apparatus for use in vehicular transportation, including a belt, a spool for retractably storing the belt, and a clamp which engages the belt and allows for automatic adjustment of the belt to fit the user.

16 Claims, 7 Drawing Figures

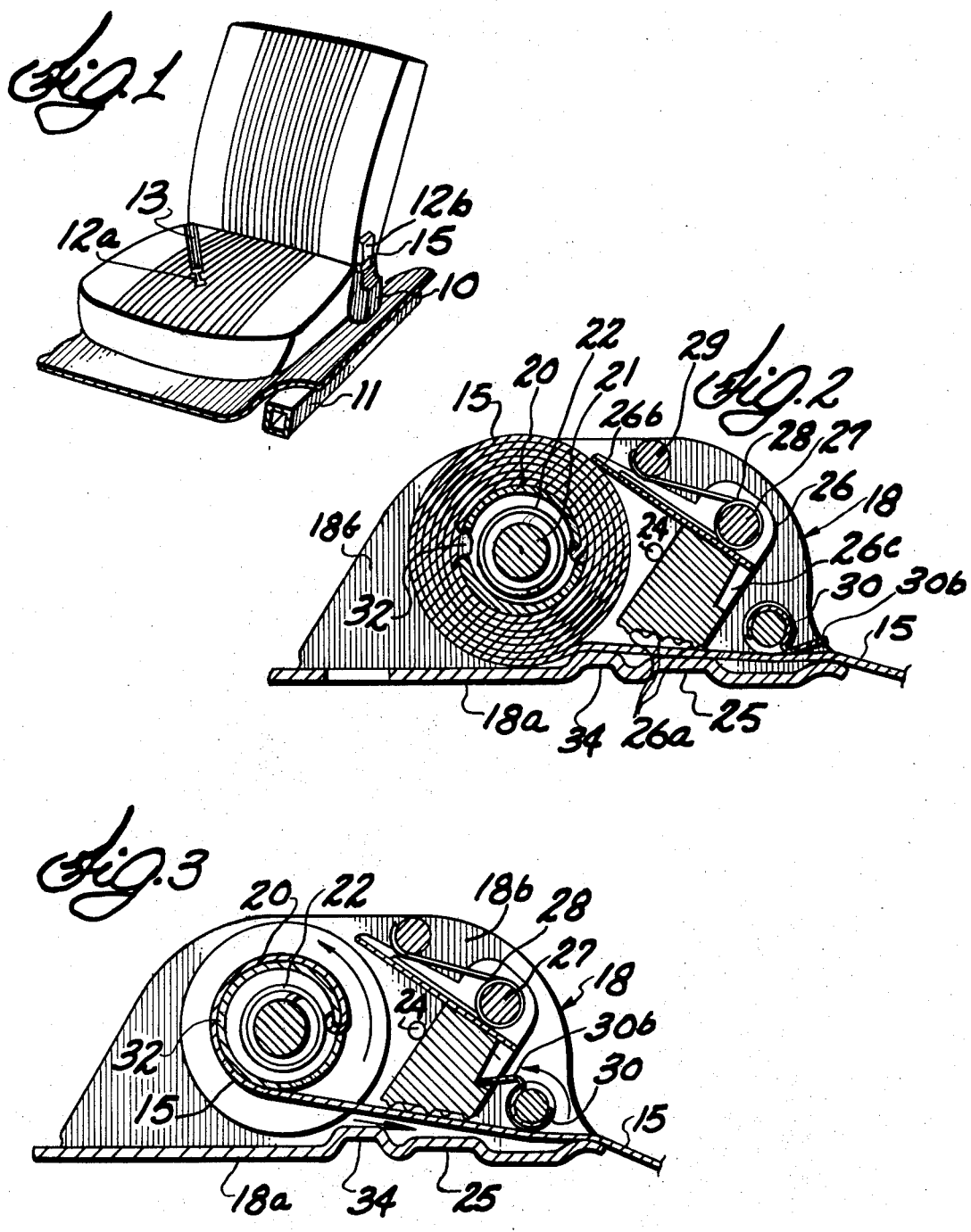

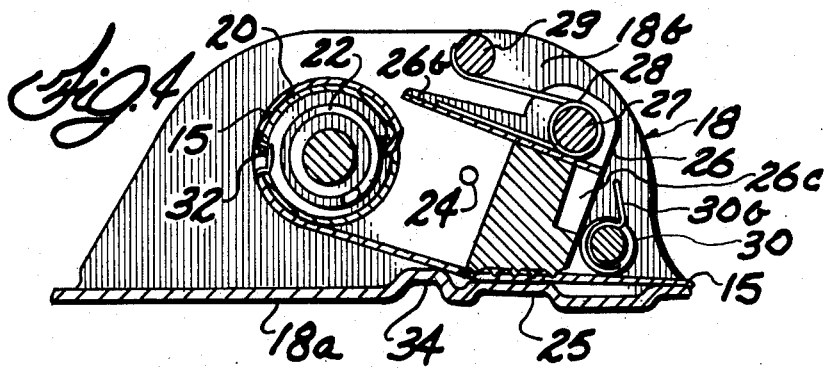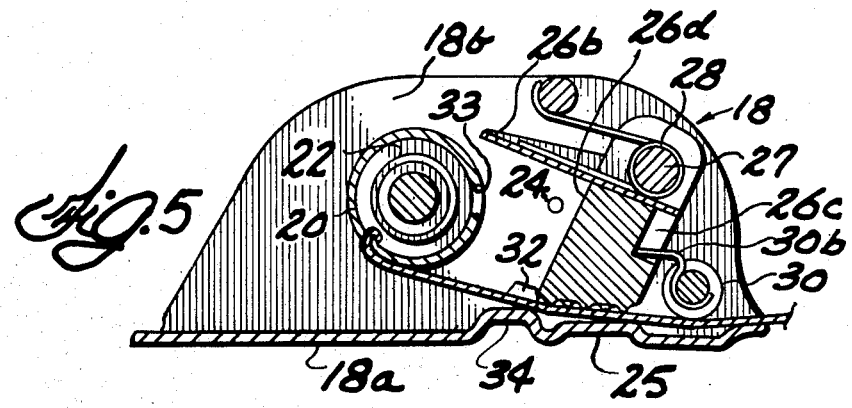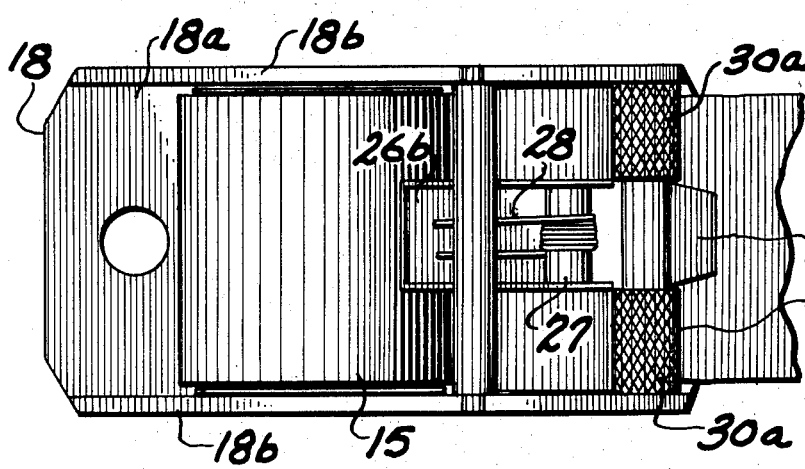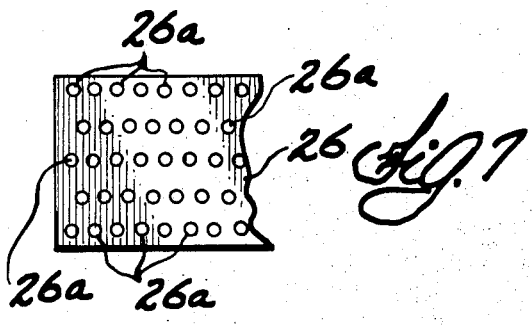

RETRACTABLE SAFETY BELT DEVICE

The present invention relates to a retractable safety belt device for use in connection with vehicular transportation and, more particularly, to a seat belt system including means for automatically adjusting the seat belt on a user thereof.

As is well known, injuries arising from vehicular traffic accidents are often caused by excessive forces acting on localized areas of the human body. Injury, of course, results when the localized force per unit area exceeds the stress tolerance of the body area involved. The unit area force applied against the body depends not only upon how quickly the body is brought to rest but also on the amount of body area absorbing the force. If, for example, in a collision, the vehicle is brought to rest in 2 feet, the passenger may be brought to rest in 2 inches by being thrown against an instrument panel or a seat back, which collapses only 2 inches, thus substantially increasing the deceleration and the resultant force.

Assuming the body of the vehicle is designed to withstand given forces without crushing the occupants, the seriousness of the injury can be reduced by (1) reducing the stopping force through increasing the distance over which the vehicle occupant is stopped or (2) by reducing the force concentration by extending the area upon which the force acts. Seat belts will accomplish both of these results, i.e., seat belts will slow the forward motion of the occupant at the same rate as the vehicle and spread the decelerative forces over a broader area. Such a restraining device not only prevents the person from being hurled against unyielding objects inside the vehicle and from being thrown out of the vehicle, but also, due to the length and breadth of the belt, broadens the area over which the forces act and utilizes the resilience of the body to reduce the rate of deceleration.

Obviously, to be of any value a seat belt must be worn. Because of many shortcomings in present seat belt installations, there is a large tendency to avoid using them, especially during short trips. Ironically, the effectiveness of seat belts is probably greater at the low speeds often encountered during short trips than at higher speeds more common to long trips.

Among the numerous problems and shortcomings of present day belts are: (a) they are difficult to buckle since the occupant must ordinarily be seated prior to buckling and is frequently seated on the free ends of the belt and/or the free ends become crossed or entangled or embedded in the crevice between the upper and lower cushions of the seat; (b) in an automobile the free ends of the belt adjacent a door frequently become caught in or dangle exteriorly of the door when not in use, which exposes them to damage through closing of the door thereon, chapping and corrosion; (c) when not in use, seat belts are either on the seat, causing discomfort, or lie awkwardly on the floor or in an unruly pile on the seat; (d) means which have been devised to offset some of these shortcomings are difficult and expensive to manufacture; and (e) present seat belts must be manually adjusted to the user and, since users often fail to adjust the seat belts, the seat belts are often too loose to be of any value.

Retractable seat belts have been provided in an attempt to overcome the foregoing shortcomings. Such retractable seat belts have been designed with means for automatically adjusting the seat belt on a user when such means is rendered operable by the user. For this latter purpose, a lever is provided which is operated by the user to render the seat belt adjusting means operative. Thereafter, the lever must be moved to a locking position which locks the seat belt against further extraction so that the user is strapped in place thereby. In the event a user fails to move the lever to the locking position, the seat belt does not serve its intended purpose, since the seat belt is free to be extracted further and the user may be thrown forward in the face of a collision or the like. Consequently, it has been desirable to provide an automatically adjustable seat belt device which does away with the need for manual operation of a lever or the like to adjust the seat belt and to thereafter lock the seat belt against further extraction.

Accordingly, it is a principal object of the present invention to provide a new and improved retractable seat belt device which overcomes the shortcomings of present seat belt devices. More specifically, it is an object to provide such a device which functions to automatically adjust the seat belt to a user. In this connection, it is an object to provide a new and improved retractable seat belt device which automatically adjusts itself to a user.

A general object of the present invention is to provide an improved seat belt system characterized in its simplicity and low cost of manufacture.

Other objects and advantages of the present invention will become apparent upon reading the attached detailed description taken in conjunction with the drawings.

In one form of the invention, a retractable safety belt device is provided wherein an elongate flexible web is secured to web storage means and means are provided for urging the storage means to store the web so that in the absence of opposing force the web is stored thereby. Clamp means are associated with the web and are responsive to extraction of the web subsequent to a slight retraction after a prescribed amount of extraction thereof from the storage means for clamping the web to prevent the further extraction thereof. The web is always freely movable in the retracting direction. The device may include means for preventing the application of tension to the connection between the web and the storage means when the web is being extracted.

The present invention will now be described in conjunction with the drawings wherein:

FIG. 1 is a perspective view of an improved seat belt system mounted in a vehicle;

FIG. 2 is a side sectional view of a seat belt rewind and clamping unit forming a part of the system of FIG. 1 which is constructed in accordance with the teachings of the present invention and which is shown in its fully retracted position;

FIG. 3 is a view corresponding to that shown in FIG. 2 wherein the unit is shown in its partially extracted position;

FIG. 4 is a view corresponding to that shown in FIG. 2 wherein the unit is shown in its belt clamping position;

FIG. 5 is a view corresponding to that shown in FIG. 2 wherein the unit is shown in its fully extracted position;

FIG. 6 is a top elevational view of the belt rewind and clamping unit shown in FIGS. 2–5; and FIG. 7 is a view showing the teeth of a clamping member utilized in the belt rewind and clamping unit of FIGS. 2–6.

While the invention has been shown and will be described in some detail with reference to a particular exemplary embodiment thereof, there is no intention that it be limited to such detail. Quite to the contrary, it is intended here to embrace all modifications, alternatives and equivalents falling within the spirit and scope of the invention as defined by the appended claims.

Referring now to the drawings, and more particularly to FIG. 1, a seat belt system is shown which includes a belt rewind and clamping unit 10 constructed in accordance with the teachings of the present invention mounted on the vehicle frame 11 and an associated short seat belt portion 13 with a receptacle member 12a of a buckle secured to the end thereof. An elongate web or seat belt 15 is wound substantially completely within the rewind unit, in the condition as shown in FIG. 1, leaving a latch portion 12b of the buckle protruding therefrom.

Referring now to FIGS. 2–6, the internal working parts of the belt rewind and clamping unit 10 constructed in accordance with the teachings of the present invention are shown. The belt rewind and clamping unit includes a support casing 18 which has a base portion 18a and a pair of upstanding face portions 18b. Web or seat belt storage means in the form of a spool 20 is mounted on a support rod 21 suitably connected between the upstanding face portions 18b of the casing and one end of the web or seat belt 15 is suitably secured to the spool 20. A spiral torsion spring 22 is provided within the spool 20 which has one end connected to the spool and the other end connected to the rod 21 and which urges the spool to rotate in the clockwise direction as viewed in FIGS. 2–5 to wind the seat belt thereon. Consequently, in the absence of opposing force being applied to the seat belt 15, the seat belt is wound onto the spool 20 and is stored thereon as shown in FIG. 2. The details of the belt storage spool 20 do not in and of themselves constitute a portion of the present invention and therefore greater details thereof have not been set forth. Moreover, any conventional spool of this type may be utilized which will automatically rewind the seat belt thereon in the absence of opposing force being applied to the seat belt.

In keeping with the present invention, a new and improved clamping system is provided for allowing the seat belt to be retracted to automatically adjust it about a user and for clamping the seat belt 15 in place to prevent the further extraction thereof once the seat belt is secured in place on a user. The clamping system includes a stationary clamp face 25 which is formed as a part of the base portion 18a of the casing 18 and a releasable self-locking clamp member 26 which is pivotally mounted on a support pin 27 suitably connected between the upstanding face portions 18b of the casing 18 for movement between a nonclamping position, as shown in FIGS. 2 and 3, and a clamping position, as shown in FIG. 4. The nonclamping position of the clamp member 26 is determined by a stop pin 24 which limits the clockwise movement thereof. As may be seen, the seat belt 15 extends between the clamp face 25 and the clamp member 26 so that the belt may be clamped or gripped therebetween. The clamp member 26 is provided with a plurality of outwardly extending teeth 26a in the lower extremity thereof, and the web or seat belt 15 is formed from a material which will accommodate the teeth in locking relationship. Moreover, when the seat belt is extracted from the casing 18 and engages the teeth 26a, the clamp member is thereby drawn toward the clamping position.

The clamping system is designed to maintain the clamp member 26 in the nonclamping position when the seat belt 15 is initially being extracted from the casing 18 and to release the clamp member 26 when the belt is retracted a slight amount subsequent to a prescribed amount of the belt being extracted so that the clamp member 26 is drawn into clamping relationship with the face 25 by the belt when a force is imparted to the belt in the extracting direction. Thus, further extraction of the belt is prevented.

For the purpose of maintaining the clamp member 26 in the nonclamping position when the belt 15 is substantially fully wound upon the spool 20, as shown in FIG. 2, a lever arm 26b is provided which extends outwardly from the clamp member 26. In the exemplary arrangement, the lever arm 26b is formed separately from the clamp member 26 and is likewise pivotally mounted on the pin 27. However, the lever arm 26b and the clamp member 26 are related so that they pivot together, though a slight amount of play may exist therebetween. It will be apparent that, if desired, the lever arm 26b may be formed integrally with the clamp member 26. The lever arm 26b engages the outer surface of the seat belt 15, when the belt is substantially fully wound upon the spool 20, to maintain the clamp member 26 in the nonclamping position as shown in FIG. 2 so that the belt is free to move past the clamp member 26 without engaging the teeth 26a. A spiral torsion spring 28 is provided for urging the lever arm 26b, and thus for also urging the clamp member 26, to pivot in the counterclockwise direction, as viewed in FIGS. 2–5, and thus urges the clamp member 26 toward the gripping position as shown in FIG. 4. As may be seen, the main body portion of the torsion spring 28 is disposed on the pin 27 and the ends thereof are disposed between the lever arm 26b and a stationary pin 29 secured between the upstanding face portions 18b of the casing 18. When a prescribed amount of seat belt 15 has been unwound from the spool 20, the lever arm 26b is free to be pivoted a prescribed amount in the clockwise direction by the torsion spring 28 to take up any slack between the lever arm and the clamp member 26 and to urge the clamp member 26 toward the seat belt 15. The torsion spring 28 is designed to be relatively weak so that the clamp member 26 is only lightly urged toward the seat belt 15. At this time, in the absence of opposing force being applied to the clamp member 26 or the clamp member being held against pivotal movement, the clamp member 26 is driven into engagement with the belt so that the teeth 26a lightly engage the belt.

For the purpose of preventing the clamp member 26 from being pivoted into engagement with the seat belt 15 by the torsion spring 28 during the time period when the belt is being extracted from the casing 18 and unwound from the spool 20, even though the lever arm 26b no longer engages the outer surface of the belt on the spool, a rotatable cam member 30 is provided which is mounted between the upstanding portions 18b of the casing 18 adjacent the clamp member 26. As may be seen, the seat belt 15 passes between the cam member 30 and the face portion 18a of the casing 18 in sliding engagement with the cam member 30. The cam member 30 is provided with serrated portions, 30a as best seen in FIG. 6, engaged by the seat belt so that the cam member 30 is rotated in the counterclockwise direction, as viewed in FIGS. 2–5, when the seat belt moves therepast. The rotatable cam member 30 has an extending lever arm 30b which is adapted to be received within a recessed portion 26c of the clamp member 26 and is adapted to engage the clamp member 26, as shown in FIG. 3, to prevent the pivotal movement of the clamp member 26 into engagement with the belt 15. When the seat belt 15 is extracted from the casing 18, the cam member 30 is rotated in the counterclockwise direction so that the lever arm 30b is pivoted into engagement with the clamp member 26 and the clamp member is prevented from being pivoted into engagement with the belt. Thereafter, when the web or belt 15 is allowed to be retracted a slight amount and rewound onto the spool 20, the cam member 30 is rotated in the clockwise direction so that the lever arm 30b is pivoted out of engagement with the clamp member 26. At this time, the clamp member 26 is pivoted in the counterclockwise direction by the torsion spring 28 so that the teeth 26a of the clamp member lightly engage the belt 15, and the clamp member 26 assumes a clamp conditioning position. If force is subsequently applied to the web or belt 15 in the extracting direction (from left to right as viewed in FIGS. 2–5), the clamp member is pivoted in the counterclockwise direction to the clamping position shown in FIG. 4 and the teeth 26a of the clamping member 26 are drawn into locking relationship with the belt to prevent the further extraction of the belt 15 from the casing 18 and from the spool 20.

When the clamp member 26 has assumed the clamping position, the belt 15 is still free to be retracted and rewound on the spool 20. In the absence of external opposing force being applied to the belt 15, the torsion spring 22 associated with the spool 20 causes the spool to rotate in the clockwise direction so that the belt 15 is retracted and rewound on the spool. Under such conditions, the belt 15 imparts pivotal movement to the clamp member 26 which is pivoted in the clockwise direction out of clamping relationship with the clamp face 25 so that the belt 15 is free to move therepast. For this latter purpose, it will be apparent that the spring 22 is to be substantially stronger than the spring 28.

Thus, it will be apparent that a new and improved seat belt rewind and clamping unit has been provided which employs a new and improved releasable self-locking clamp system. More specifically, a new and improved seat belt system has been provided wherein the seat belt is clamped against further extraction when the belt is retracted a slight amount subsequent to a prescribed amount thereof being extracted, the belt being free to be rewound upon storage means in the absence of external opposing force being applied thereto.

A brief description of a typical operation of the above-described seat belt system may be helpful in understanding the present invention. Let it be assumed that the seat belt rewind and clamping unit is initially in the nonclamping condition, as shown in FIG. 2, and a user has taken his place in the seat of a vehicle shown in FIG. 1. The receptacle member 12a may be grasped in the user's right hand and the short belt portion 13 may be pulled around the user. At the same time, the latch portion 12b may be grasped in the user's left hand and may be pulled toward the receptacle member 12a so that the latch portion is inserted within the receptacle member and the seat belt system is secured in place. When the latch portion 12b is pulled toward the receptacle member 12a, the seat belt or web 15 is extracted from the rewind and clamping unit 10 and is unwound from the spool 20. As the belt 15 is unwound from the spool 20, a point is reached whereat the lever 26b no longer maintains the clamp member 26 in the nonclamping position. As the belt 15 is initially extracted from the rewind unit the rotatable member 30 is rotated in the counterclockwise direction as viewed in FIGS. 2–5, so that the associated lever arm 30b is pivoted into engagement with the clamp member 26 to prevent the clamp member 26 from being pivoted in the counterclockwise direction into engagement with the belt 15. Subsequent to the time when the latch portion 12b is inserted in the receptacle member 12a by the user, the user releases these portions of the system. At such time, the excess portion of the belt 15 is retracted by the rewind and clamping unit 10 and rewound upon the spool 20. During the period when this portion of the belt is being retracted, the rotatable member 30 is rotated thereby in the clockwise direction to the position shown in FIG. 2, so that the lever arm 30b is pivoted out of engagement with the clamp member 26 and the clamp member is pivoted by the torsion spring 28 into engagement with the belt so that the teeth 26a lightly engage the belt.

Thereafter, if the vehicle is in a collision or the like wherein the user is thrown forward, extracting force is applied to the belt 15 which causes the clamp member 26 to be pivoted in the counterclockwise direction so that the teeth 26a of the clamp member move into locking relationship with the belt and the belt is clamped between the clamp member 26 and the clamp face, as shown in FIG. 4, to prevent the further extraction of the belt 15. Thus the user will be held against forward movement by the seat belt. When the latch portion 12b of the buckle is subsequently released from the receptacle member 12a by the user, the torsion spring 22 functions to cause the belt 15 to be rewound upon the spool 20.

In accordance with a further aspect of the present invention, means are provided for preventing the application of tension to the connection between the web or seat belt 15 and the spool 20. For this purpose, a projecting member 32 is mounted on the belt 15 near the connection between the belt and the spool 20. The projecting member 32 engages the rear surface 26d of the clamp member 26 when the belt is substantially unwound from the spool to prevent further extraction of the belt from the rewind unit and to prevent the application of tension to the connection between the belt and the spool. As will be readily apparent, any force applied to the belt 15 in the extracting direction subsequent to the time that the projecting member 32 engages the clamp member 26 will be applied to the projecting member 32 and the clamp member 26 to urge the clamp member toward the clamping position. An aperture 33 is provided in the spool 20 to accommodate the projecting member 32 when the web is wound upon the spool (see FIGS. 2–4). For the purpose of insuring that the projecting member 32 engages the rear surface 26d of the projecting member 26, a raised portion or protuberance 34 is provided in the base portion 18a of the casing 18 which engages the lower surface of the belt 15. Thus, the belt 15 is maintained at a level whereat the projecting member 32 engages the rear surface 26d of the clamp member.

In accordance with a final aspect of the present invention, the teeth 26a are substantially conical in form. Consequently, the teeth are firmly drawn into the fiber of the belt 15 during a clamping operation so that the teeth are readily accommodated in locking relationship and will not damage the belt.

In view of the foregoing, it will be seen that the new improved seat belt system has been provided wherein the seat belt system automatically adjusts itself to secure a user in place on a seat. More specifically, a new improved rewind and clamping unit has been provided for automatically adjusting the seat belt around a user and for automatically locking the seat belt in place to secure the user in place.

What is claimed is:

1. In a retractable safety belt device, the combination which comprises an elongate flexible web, web storage means having one end of the web secured thereto, means for urging the storage means to store the web so that in the absence of opposing force the web is stored thereby, releasable self-locking clamp means spaced from said storage means having opposed clamping surfaces between which the web freely passes when in the nonclamping position, means for maintaining the clamp means in the nonclamping position and spaced from the path of said web therebetween when the web is substantially completely stored by the storage means, and means responsive to extraction of the web from the storage means for maintaining the clamp means in the nonclamping position and spaced from the path of said web therebetween, said means for maintaining being responsive to a slight retraction of the web subsequent to a prescribed amount of extraction for releasing the clamp means so that, responsive to extracting force subsequently being applied to the web, the web is clamped thereby to prevent further extraction of the web, the web always being freely movable in the retracting direction.

2. In a retractable safety belt device, the combination which comprises an elongate flexible web, web storage means having one end of the web secured thereto, means for urging the storage means to store the web so that in the absence of opposing force the web is stored thereby, releasable self-locking clamp means spaced from said storage means having opposed clamping surfaces between which the web freely passes when in the nonclamping position, means for normally maintaining the clamp means in a nonclamping position and spaced from the path of said web therebetween, said means for maintaining being responsive to a slight retraction of the web subsequent to a prescribed amount of extraction thereof from the storage means for releasing the clamp means so that, responsive to extracting force subsequently being applied to the web, the web is clamped thereby to prevent further extraction of the web, the web always being freely movable in the retracting direction and being freely movable along a path spaced from said clamping surfaces when said clamping surfaces are in the nonclamping relationship.

3. In a retractable safety belt device, the combination which comprises an elongate flexible web, web storage means having one end of the web connected thereto to form a connection therebetween, means for urging the storage means to store the web so that in the absence of opposing force the web is stored thereby, clamp means spaced from said storage means, associated with the web and responsive to extracting force being applied to the web subsequent to a slight retraction after a prescribed amount of extraction thereof from the storage means for clamping the web to prevent the further extraction thereof, the web always being freely movable in the retraction direction, and means providing a positive connection between said web and said clamping means and stopping the extraction of said web for preventing the application of tension to the connection between the web and the storage means when the web is being extracted but is not quite fully extracted.

4. In a retractable safety belt device, the combination which comprises a casing, an elongate flexible web, web storage means mounted within the casing and having one end of the web secured thereto, means for urging the storage means to store the web so that in the absence of opposing force the web is stored thereby, clamp means spaced from said storage means having opposed clamping surfaces between which the web freely passes when in the nonclamping position, and associated with the web and responsive to extracting force being applied to the web subsequent to a slight retraction after a prescribed amount of extraction thereof from the storage means for clamping the web and preventing further extraction thereof, and control means for said clamp means maintaining said clamp means spaced from the path of said web in a nonclamping position prior to said subsequent slight retraction whereby said web is free to pass between said clamp means without exerting force on said clamp means.

5. In a retractable safety belt device, the combination which comprises an elongate flexible web, web storage means having one end of the web secured thereto for drawing the web theretoward and for storing the web in the absence of opposing force being applied to the web, the web being extracted from the storage means when sufficient opposing force is applied thereto, clamp means having opposed clamping surfaces between which the web freely passes when in the nonclamping position, and associated with the web and responsive to extracting force being applied to the web subsequent to a slight retraction after a prescribed amount of extraction thereof from the storage means for clamping the web and preventing further extraction thereof, the web always being freely movable in the retracting direction, and control means for said clamp means maintaining said clamp means spaced from the path of said web in a nonclamping position prior to said subsequent slight retraction whereby said web is free to pass between said clamp means without exerting force on said clamp means.

6. In a retractable safety belt device, the combination which comprises a casing, an elongate flexible belt, a storage spool mounted in the casing and having one end of the belt connected thereto, means for urging the spool to wind the belt thereon so that in the absence of opposing force the belt is stored on the spool, a releasable self-locking clamp mounted in the casing, the clamp including a clamp member pivotally mounted in the casing for movement between a clamping position and a nonclamping position and a clamp face for cooperating with the clamp member, the belt extending through the clamp between the clamp member and the clamp face in engagement with the clamp face, means for maintaining the clamp member in the nonclamping position as long as a prescribed amount of belt is wound on the spool, and means responsive to extraction of the belt from the casing for maintaining the clamp member in the nonclamping position and responsive to a slight retraction of the belt subsequent to a prescribed amount of extraction for driving the clamp member into light engagement with the belt so that, responsive to extracting force being applied to the belt, the clamp member is drawn to the clamping position and the belt is clamped between the clamp member and the clamp face to prevent the further extraction thereof, the belt always being freely movable in the retracting direction, and control means for said clamp means maintaining said clamp means spaced from the path of said belt to a nonclamping position prior to said subsequent slight retraction whereby said web is free to pass between said clamp means without exerting force on said clamp means.

7. The device as recited in claim 6 wherein the means for driving the clamp member into light engagement with the belt includes a torsion spring.

8. The device as recited in claim 6 wherein the means for maintaining the clamp member in the nonclamping position as long as a prescribed amount of belt is wound on the spool includes a lever arm associated with the clamp member which engages the outer surface of the belt wound on the spool.

9. The device as recited in claim 6 wherein the casing has a base portion and upstanding face portions and the spool is supported immediately adjacent the clamp by means extending between the face portions.

10. The device as recited in claim 6 wherein the clamp member has a plurality of outwardly extending teeth and the belt is formed to accommodate the teeth in locking relationship.

11. The device as recited in claim 10 wherein the teeth are conical in form.

12. The device as recited in claim 6 wherein means are provided for stopping the extraction of said belt and preventing the application of tension to the connection between the belt and the spool as the belt is being extracted but is not quite fully extracted and for tightening the clamp against the belt.

13. The device as recited in claim 12 wherein the tension prevention means and means for tightening the clamp against the belt includes means mounted on the belt adjacent said connection for engaging the clamp member, the means mounted on the belt also preventing full extraction of the belt.

14. The device as recited in claim 13 wherein the means mounted on the belt is a projecting member and wherein an aperture is provided on the spool which is adapted to accommodate the projecting member when the belt is wound on the spool.

15. In a retractable safety belt device, the combination which comprises a casing having a base portion and upstanding face portions, an elongate flexible belt, a storage spool mounted between said face portions and having one end of the belt secured thereto, means for urging the spool to wind the belt thereon so that in the absence of opposing force the belt is stored on the spool, a releasable self-locking clamp mounted in the casing, the clamp including a clamp member pivotally mounted in the casing for movement between a clamping position and a nonclamping position and a clamp face for cooperating with the clamp member, the belt extending through the clamp between the clamp member and the clamp face in engagement with the clamp face, means for maintaining the clamp member in the nonclamping position as long as a prescribed amount of belt is wound on the spool, means responsive to extraction of the belt from the casing for maintaining the clamp member in the nonclamping position and responsive to a slight retraction of the belt subsequent to a prescribed amount of extraction for driving the clamp member into light engagement with the belt, said means including a rotatable member mounted between the face portions of the casing so that the belt extends between the base portion and the rotatable member in engagement therewith, the rotatable member having serrated portions for engaging the belt and having an extending lever arm adapted to engage the clamp member, the rotatable member being rotated in one direction when the belt is extracted so that the lever arm is moved into engagement with the clamp member to maintain the clamp member in the nonclamping position and being rotated in the opposite direction when the belt is retracted so that the lever arm is moved out of engagement with the clamp member to release the clamp member, the belt always being freely movable in the retracting direction.

16. In a retractable safety belt device, the combination which comprises an elongate flexible web, web storage means having one end of the web secured thereto, means for urging said storage means to store the web so that in the absence of opposing force the web is stored thereby, releasable self-locking clamp means through which the web passes, means for maintaining said clamp means in the nonclamping position when the web is substantially completely stored by the storage means, and means responsive to extraction of the web from the storage means for maintaining the clamp means in the nonclamping position and responsive to a slight retraction of the web subsequent to a prescribed amount of extraction for releasing the clamp means, said means for responding to the slight retraction of the belt including a rotatable member mounted between the face portions so that the belt extends between the face portion and the rotatable member in engagement therewith, the rotatable member having serrated portions for engaging the belt and having an extending lever arm adapted to engage the clamp member, the rotatable member being rotated in one direction when the belt is extracted so that the lever arm is moved into engagement with the clamp member to maintain the clamp member in the nonclamping position and being rotated in the opposite direction when the belt is retracted so that the lever arm is moved out of engagement with the clamp member to release the clamp member, the web always being freely movable in the retracting position.

* * * * *